US005723204A

United States Patent [19]

Stefik

[11] Patent Number: 5,723,204

[45] Date of Patent: Mar. 3, 1998

[54] TWO-SIDED ELECTRICAL PAPER

[75] Inventor: Mark J. Stefik, Woodside, Calif.

[73] Assignee: Xerox Corporation, Stamford, Conn.

[21] Appl. No.: 578,257

[22] Filed: Dec. 26, 1995

[51] Int. Cl.[6] .......................................... B32B 3/00

[52] U.S. Cl. ...................... 428/206; 428/211; 428/411.1; 428/457; 428/464; 428/537.5; 428/537.7; 428/689; 101/130

[58] Field of Search .............................. 428/206, 211, 428/411.1, 457, 464, 537.5, 537.7, 689

[56] References Cited

U.S. PATENT DOCUMENTS 4,196,044 4/1980 Mussoni et al. .................... 162/112
4,407,697 10/1983 Sadler et al. .................... 162/137
4,673,607 6/1987 Hata et al. .................... 428/172
5,446,577 8/1995 Bennett et al. .................... 359/273

*Primary Examiner*—William Krynski
*Attorney, Agent, or Firm*—Robert Cunha

[57] ABSTRACT

Two sided electric paper that can be written onto on both sides by having a layer of conductive material between two sheets of electric paper. The electric paper is made of small balls encased in a liquid so that they are free to rotate, and then suspended in a solid substrate. Each ball has two hemispheres, one white and one black, each hemisphere also having a different electrical quality. Thus, in an electric field, the balls can be made to rotate to create an image of black and white areas. The intermediate conductor electrically isolates each sheet of electric paper so that both sides can be written onto at the same time.

4 Claims, 4 Drawing Sheets

TWO-SIDED ELECTRICAL PAPER

BACKGROUND OF THE INVENTION

Two sided reusable electric paper, either side of which can be independently erased or written onto, and more specifically, two sheets of electric paper separated by a conductive ground plane to allow independent erasure and writing.

One sided electric paper consists of a polymer substrate with little balls embedded that are white on one side and black on the other, as described in U.S. Pat. No. 5,604,027, Some Uses of Microencapsulation for Electric Paper, by Nicholas Sheridon, incorporated herein by reference. Under the influence of an electric field, the ball rotates so that either the white side or the black side is on top.

Printing is accomplished by imposing an electrical pattern over the sheet, where there is a voltage difference between the top side and the bottom side. A typical way to do this is to pass the paper under a charging bar. As the paper passes under the bar, voltages are applied along a set of closely-spaced electrical contacts, one for each pixel or printing element. This is the same kind of amorphous silicon charging bar that is used for printing on regular paper, except for differences in required voltages.

Approached in this way, electric paper supports "printing" on only one side. The back side of the paper is either a negative image of the information, or an opaque plastic. Any attempt to put the paper through again to print on the other side would erase the information on the first side. An improvement would be a configuration that would allow printing on both sides.

SUMMARY OF THE INVENTION

Two sided electric paper can be produced by sandwiching a conductive metallic sheet between two pieces of regular electric paper. The metalic sheet should be arranged so that electrical contact to it can be made during the printing process. For example, if it is slightly larger than the sheet of electric paper on both sides, a conductive strip could be accessible along both edges.

There are many possible variations for this. For example, there could be access along one edge only. In general, it is suggested that the exposed conductors be configured so that their orientation on the page is the same when the paper is flipped over, so as to simplify the printing mechanism and so as to assure that the user does not have to think about the orientation of the page when he puts it in an electric paper printer.

The internal metal sheet acts like a ground plane when printing, and electrically isolates one side of the electric paper from the other. This makes it possible to print on one side and then the other. With the appropriate doubling of the print bar in the printer, it would be possible to print on both sides of the electric paper at once using the internal sheet as a ground plane.

On advantage of this resultant system of printing is that it would allow two sided printing, a feature that all existing xerographic, ink jet, laser and mechanical printers lack. Not only is two sided printing enabled by this invention, but also, the resultant printer is mechanically simple and inexpensive, and would use a minumum of resources. More specifically, the printer would consist of nothing more than two electrical print bars and some rollers. As a result, the system would be far simpler than current printers since there is no need for a paper handler to turn the paper over to print the other side.

One more reason for using electric paper instead of regular paper is the conservation of resources. A piece of electric paper is saved and reused where paper made from trees is routinely thrown away after one use. However, electric paper in single sheets is not what we are used to handling. Regular paper printed on one side will be blank on the other side, while electric paper printed on one side has a negative image on the other. Two sided electric paper is more conventional. If it is printed on one side only, the other side can be white, or it can be printed on both sides, just like the regular paper that we are accustomed to.

DETAILED DESCRIPTION OF THE INVENTION

Figure 1:
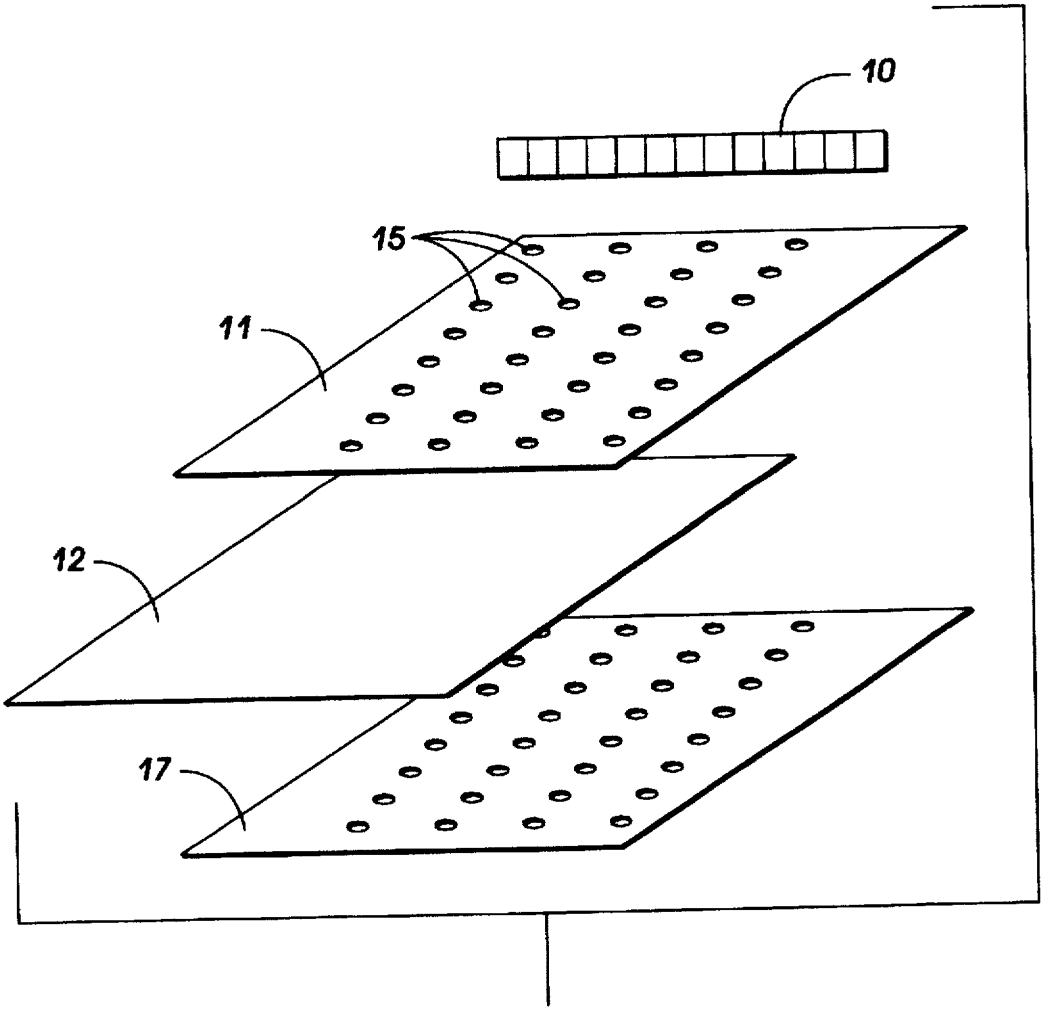
FIG. 1 is an expanded view of the two sided electric paper assembly showing the tow sheets of electric paper, the ground plane and the charging bar.

FIG. 1 is an expanded view of the two-sided electric paper, showing an upper sheet 16 and an identical lower sheet 17 separated by a a layer of conducting material such as a metallic ground plane 12. Each sheet 16 has black and white balls 15 floating in a liquid sphere, and imbedded in the substrate 11. The charging bar 10 comprises a number of electrical points which can be slid over the surface of the sheet 15 to force either the white or black side of the sheet to be upward, to erase or create an image. The ground place 12 is between the sheets, 16 and 17, so that writing on the upper sheet has no effect on the lower. Finally the sheet can be turned over to erase or write on the other side.

Figure 2:
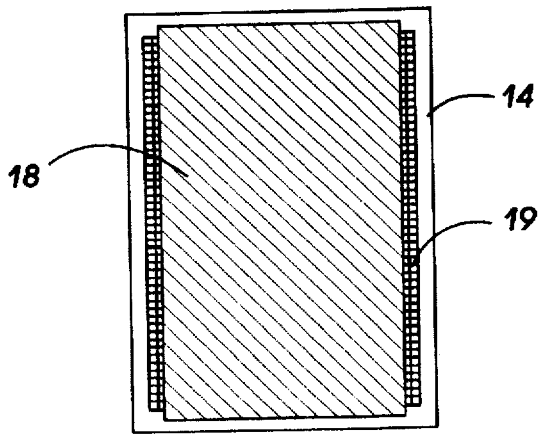
FIGS. 2, 3 and 4 show various configurations of the elements when assembled.

FIG. 2 shows the outline of the elements when assembled. The two sided assembly 14 shows the ground plane 19 as being slightly wider then the electric paper 18 so that there is a suitable surface for the attachment of a grounding contact to the ground plane. This view shows the ground plane as projecting from both sides, which is probably the most user-friendly configuration since the user can, place the paper on a printer without considering, or being limited to, which edge must be forward in the printer.

Figure 3:
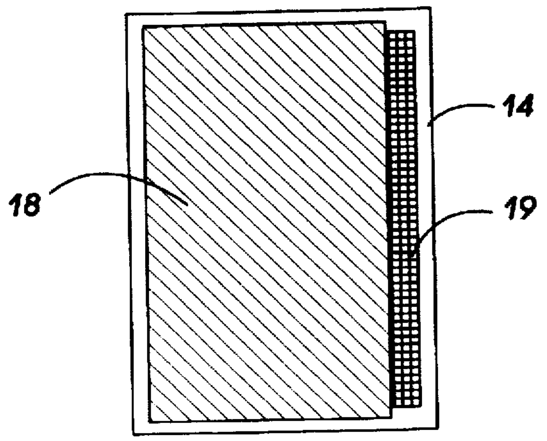
Figure 4:
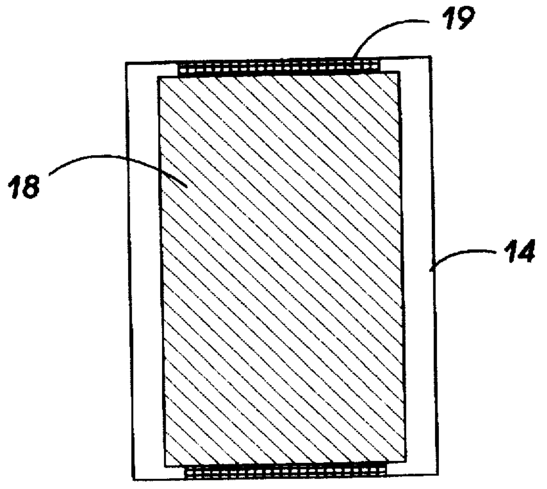

To make the metal layer accessible, it could extend past the electric paper material in various other ways. For example, it could extend out on only one of the long sides, as in FIG. 3, or on the short sides as in FIG. 4. Also, there could be a slot in the electric paper layer or a series of holes, not shown, to facilitate contact. The holes or slots could be on one or both sides (e.g., top or bottom, or both) of the sheets of electric paper. Ultimately, the most convenient configuration would be that the ground plane would be exposed on both sides, top and bottom to facilitate printing in a way that works no matter how the paper is inserted into a paper tray.

Figure 5:
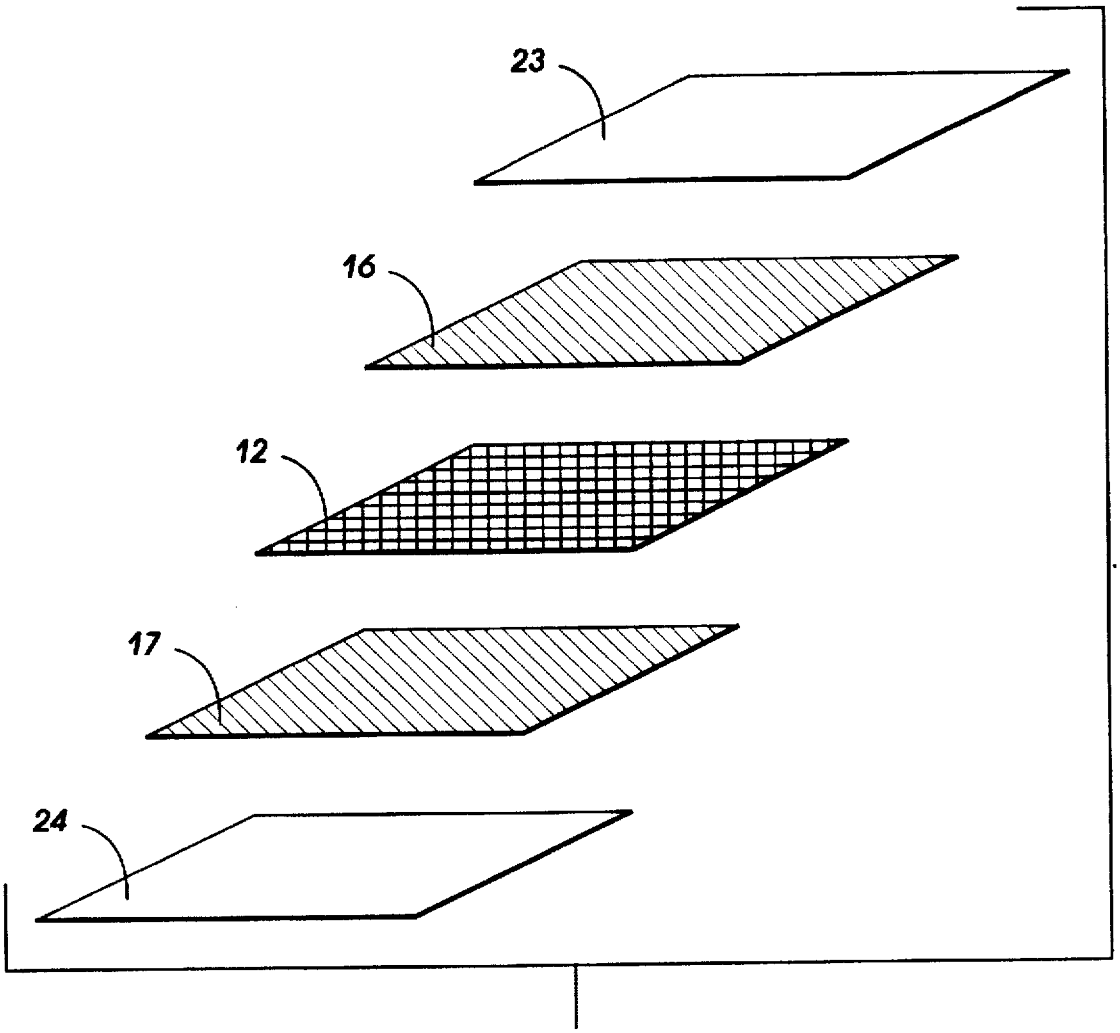
FIG. 5 is an expanded view of another embodiment of two sided electric paper.

An alternative embodiment is shown in FIG. 5. The transparent layers 23 and 24 are transparent protective material such as polymer sheets. The top sheet 23 and the bottom sheet 24 would be bound together at the edges to help provide integrity for the package. The electric paper layers 16 and 17 would be smaller than the others so that there would be a writable surface area slightly smaller that the total paper size. A means must be provided for making good electric contact with the metal foil layer 12, such as an exposed edge on one or two sides or through a slit or series of holes on one of the surfaces. Optionally, a thin adhesive layer could be used between the material layers.

Figure 6:
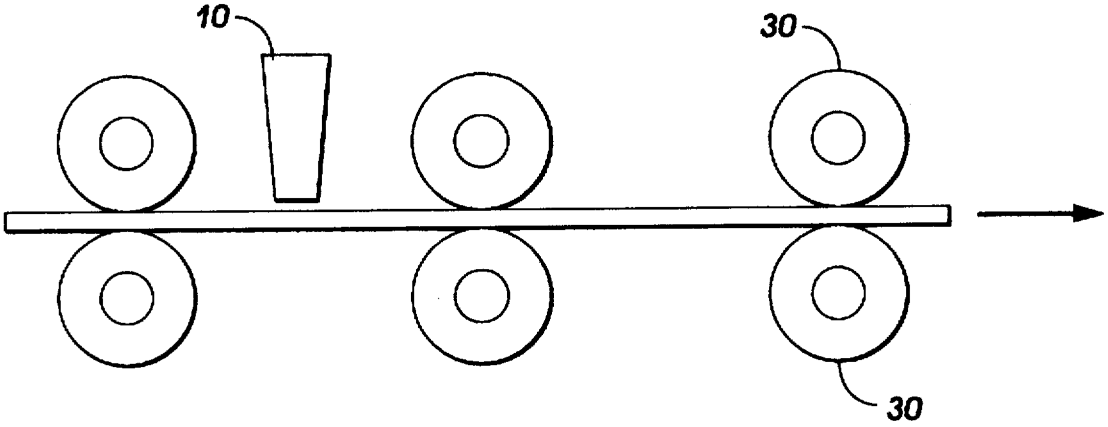
FIGS. 6 and 7 show the arrangement of print bars and rollers in relation to the electric paper.
Figure 7:
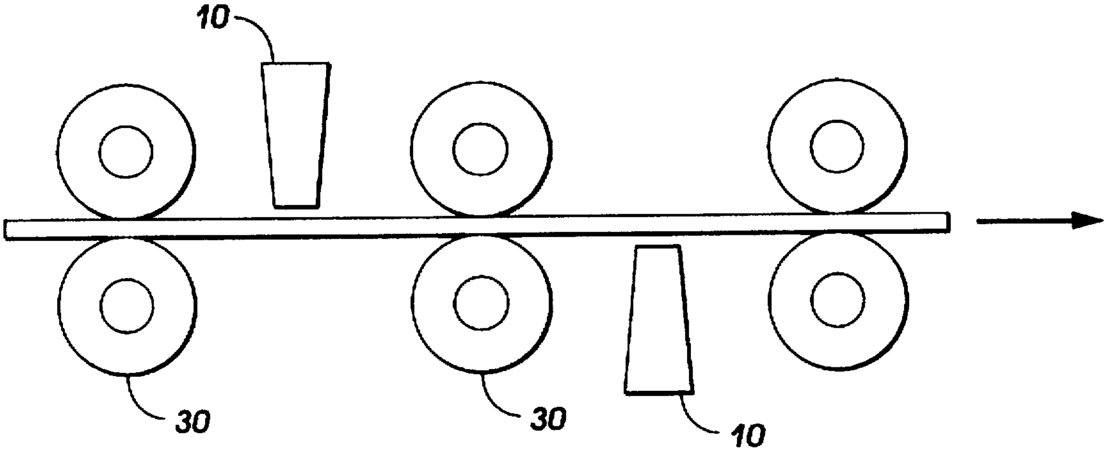

Electric paper can be moved into a printer or copier by various paper handling mechanisms such as by pinch rollers 30 as shown in FIG. 6. A print bar 10 is used to print one line of pixels across the page by applying a timed voltage at various pixels across the page. Another connection enables the metallic foil, such as aluminum or copper, to be the ground plane for this voltage. When there is one print bar 10, the paper must move through the printer twice in order to print both sides. In a variation of the printer design, there is a print bar 10 on each side of the paper, as shown in FIG. 7. This variation makes it possible to print both sides at the same time. In other variations, different means for moving the paper, other than pinch rollers, can be used, such as moving belts.

The print bar comprises a large number of conductive points etched, integrated or layered onto a substrate, each having a relatively positive or negative voltage applied. The voltage to each individual point is then turned on or off as the bar is drawn across the paper to form an image.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. Two sided electric paper comprising:

a layer of conducting material, and two sheets of electric paper, one attached to each surface of said layer.

2. The paper of claim 1 wherein said layer of conducting material is larger than said sheets of electric paper, so that the conducting material protrudes from said electric paper to form an electrical contact.

3. Two sided electric paper comprising:

a layer of conducting material, two sheets of electric paper, one attached to each surface of said layer, and two sheets of transparent protective material, one attached to each exposed surface of said sheets of electric paper.

4. A system for printing on two sided electric paper comprising:

a layer of conducting material, two single sheets of electric paper, one attached to each surface of said layer to form a two sided electric paper, and two print bars, one adjacent to each side of said two sided electric paper, and located so that the print bars will print on said two sided electric paper as said two sided electric paper is moved between said print bars.

* * * * *